(12) United States Patent
Sanderson et al.

(10) Patent No.: US 6,815,522 B1
(45) Date of Patent: Nov. 9, 2004

(54) SYNTHESIS OF ENERGETIC THERMOPLASTIC ELASTOMERS CONTAINING OLIGOMERIC URETHANE LINKAGES

(75) Inventors: Andrew J. Sanderson, North Ogden, UT (US); Wayne Edwards, Tremonton, UT (US)

(73) Assignee: Alliant Techsystems Inc., Edina, MN (US)

(*) Notice: Subject to any disclaimer, the term of this patent is extended or adjusted under 35 U.S.C. 154(b) by 325 days.

(21) Appl. No.: 09/436,440

(22) Filed: Nov. 9, 1999

Related U.S. Application Data
(60) Provisional application No. 60/108,456, filed on Nov. 12, 1998.

(51) Int. Cl.[7] ................. C08G 18/48; C08G 18/50; C08G 18/10
(52) U.S. Cl. .................. 528/76; 528/66; 528/78
(58) Field of Search .................. 528/66, 76, 78

(56) References Cited

U.S. PATENT DOCUMENTS

| | | | | |
|---|---|---|---|---|
| 2,293,868 | A | 8/1942 | Toussaint | 549/377 |
| 2,327,053 | A | 8/1943 | Marple et al. | 568/669 |
| 2,380,185 | A | 7/1945 | Marple et al. | 568/678 |
| 2,723,294 | A | 11/1955 | Benoit, Jr. | 568/606 |
| 3,042,666 | A | 7/1962 | Gentles | 536/120 |
| 3,324,108 | A | 6/1967 | Moller et al. | 536/120 |
| 3,359,217 | A | 12/1967 | Brandner | 521/159 |
| 3,417,034 | A | 12/1968 | Hoy | 568/665 |
| 3,838,108 | A | 9/1974 | Hergenrother et al. | 528/73 |
| 3,954,884 | A | 5/1976 | Kidwell | 568/620 |
| 4,112,231 | A | 9/1978 | Weibull et al. | 544/174 |
| 4,120,850 | A | 10/1978 | Pechhold | 528/66 |
| 4,201,852 | A | 5/1980 | Dieterich | 528/67 |
| 4,282,387 | A | 8/1981 | Olstowski et al. | 568/618 |
| 4,359,589 | A | 11/1982 | Brownscombe | 568/618 |
| 4,361,526 | A | 11/1982 | Allen | 264/3 C |
| 4,393,199 | A | 7/1983 | Manser | 528/408 |
| 4,405,497 | A | 9/1983 | Young et al. | 252/431 R |
| 4,477,589 | A | 10/1984 | van der Hulst et al. | 502/169 |
| 4,481,123 | A | 11/1984 | Hentschel et al. | 252/52 R |
| 4,483,978 | A | 11/1984 | Manser | 528/408 |
| 4,530,990 | A | 7/1985 | Halpaap et al. | 528/53 |
| 4,623,709 | A | 11/1986 | Bauriedel | 528/65 |
| 4,707,540 | A | 11/1987 | Manser et al. | 528/417 |
| 4,806,613 | A | 2/1989 | Wardle | 528/59 |
| 4,820,859 | A | 4/1989 | Millar et al. | 558/483 |
| 4,879,419 | A | 11/1989 | Johannessen | 568/606 |
| H717 | H | 12/1989 | Stephens et al. | 149/19.2 |
| 4,919,737 | A | 4/1990 | Biddle et al. | 149/92 |
| 4,938,814 | A | 7/1990 | Schoyer H. F. R. et al. | 149/36 |
| 4,950,341 | A | 8/1990 | Schoyer et al. | 149/22 |
| 4,960,849 | A | 10/1990 | Okabe et al. | 528/76 |
| 4,976,794 | A | 12/1990 | Biddle et al. | 149/92 |
| 4,985,584 | A | 1/1991 | Millar et al. | 558/483 |
| 4,988,797 | A | 1/1991 | Wardle et al. | 528/408 |
| 5,013,811 | A | 5/1991 | Ross | 528/60 |
| 5,120,827 | A | 6/1992 | Willer et al. | |
| 5,124,463 | A | 6/1992 | Ampleman | 552/11 |
| 5,145,974 | A | 9/1992 | Paul et al. | 549/510 |
| 5,173,538 | A | 12/1992 | Gilch et al. | 525/130 |
| 5,210,153 | A | 5/1993 | Manser et al. | 525/410 |
| 5,210,179 | A | 5/1993 | Stewart | 528/408 |
| 5,214,110 | A | 5/1993 | Ahad | 525/403 |
| 5,313,000 | A | 5/1994 | Stewart | 568/613 |
| 5,380,777 | A | 1/1995 | Willer et al. | 524/186 |
| 5,415,974 | A | 5/1995 | Kotayama et al. | 430/201 |
| 5,430,122 | A | 7/1995 | Drysdale | 528/55 |
| 5,441,993 | A | 8/1995 | Maretti | 521/174 |
| 5,498,303 | A | 3/1996 | Hinshaw et al. | 149/19.6 |
| 5,516,854 | A | 5/1996 | Wardle et al. | 525/410 |
| 5,517,857 | A | 5/1996 | Hobbs | 73/571 |
| 5,520,826 | A | 5/1996 | Reed, Jr. et al. | 252/5 |
| 5,563,206 | A | 10/1996 | Eicken et al. | 524/590 |
| 5,574,104 | A | 11/1996 | Kolycheck et al. | 525/130 |
| 5,587,553 | A | 12/1996 | Braithwaite et al. | 149/19.6 |
| 5,674,951 | A | 10/1997 | Hargis et al. | 525/410 |
| 5,677,412 | A | 10/1997 | Drysdale | 528/55 |
| 5,741,998 | A | 4/1998 | Hinshaw et al. | 149/19.6 |
| 5,747,603 | A | 5/1998 | Hinshaw et al. | 525/403 |
| 5,747,628 | A | 5/1998 | Schmalstieg et al. | 528/60 |
| 5,756,636 | A | 5/1998 | Slack et al. | 528/59 |
| 6,100,375 | A | 8/2000 | Wardle et al. | |
| 6,479,614 | B1 | * 11/2002 | Ampleman et al. | 528/78 |
| 6,600,002 | B2 | * 7/2003 | Sanderson et al. | 528/78 |

FOREIGN PATENT DOCUMENTS

| | | |
|---|---|---|
| EP | 0 353 961 | 2/1990 |
| GB | 2 307 688 A | 6/1997 |

OTHER PUBLICATIONS

Oertel; *Polyurethane Handbook: Chemistry—Raw Materials—Processing—Applications—Properties;* Hanser Publishers; New York; 1985; p. 86.*

\* cited by examiner

*Primary Examiner*—Rabon Sergent
(74) *Attorney, Agent, or Firm*—TraskBritt

(57) ABSTRACT

This thermoplastic elastomer is present in a substantially solid state suitable for use as a binder for a propellant, explosive, and/or gas generant of a supplemental restraint system. The thermoplastic elastomer is formed from a composition including A blocks which are crystalline at temperatures below about 75° C. and B blocks which are amorphous at temperatures above about −20° C. The A blocks are derived from oxetane derivatives and/or tetrahydrofuran derivatives. The B blocks are derived from oxetanes, tetrahydrofuran, oxiranes, and derivatives thereof. The A and B blocks are end-capped with at least one diisocyanate and linked with at least one difunctional oligomer having two functional groups which are reactive with free and unreacted isocyanate moieties of the diisocyanate.

20 Claims, 2 Drawing Sheets

SYNTHESIS OF ENERGETIC THERMOPLASTIC ELASTOMERS CONTAINING OLIGOMERIC URETHANE LINKAGES

Priority is claimed on United States Provisional Application No. 60/108,456 filed on Nov. 12, 1998, the complete disclosure of which is incorporated herein by reference.

BACKGROUND OF THE INVENTION

1. Field of the Invention

This invention relates to energetic thermoplastic elastomers which are useful as binders of high-energy compositions, such as propellants, especially rocket propellants and gun propellants, explosive munitions, gas generants of vehicle supplemental restraint systems, or the like, and to methods for synthesizing the same.

2. Description of the Related Art

Solid high-energy compositions, such as propellants, explosives, gasifiers, and the like comprise solid particulates, such as fuel particulates and/or oxidizer particulates, dispersed and immobilized throughout a polymeric binder matrix.

Conventional solid composite propellant binders utilize cross-linked elastomers in which prepolymers are cross-linked by chemical curing agents. As outlined in detail in U.S. Pat. No. 4,361,526, there are important disadvantages to using cross-linked elastomers as binders. Cross-linked elastomers must be cast within a short period of time after addition of the curative, which time period is known as the "pot life." Disposal of a cast, cross-linked propellant composition is difficult, and usually is accomplished by burning, which poses environmental problems. Furthermore, current state-of-the-art propellant compositions have serious problems that include their use of nonenergetic binders which have lower performance and high end-of-mix viscosities.

In view of the inherent disadvantages associated with the use of cross-linked elastomeric polymers as binder materials, there has been considerable interest in developing thermoplastic elastomers suitable as binders for solid, high energy compositions. However, many thermoplastic elastomers fail to meet important requirements expected of propellant formulations, particularly the requirement of being processable below about 120° C., it being desirable that a thermoplastic elastomeric polymer for use as a binder in a high energy system have a melting temperature of between about 60° C. and about 120° C. The melting temperature is desirably at least about 60° C. because these compositions may be subject to somewhat elevated temperatures during storage and transport, and significant softening of the compositions at such elevated temperatures is unwanted. The setting of the melting temperature at not more than about 120° C. is determined by the instability, at elevated temperatures, of many components which ordinarily go into the compositions, particularly oxidizer particulates and energetic plasticizers. Many thermoplastic elastomers exhibit high melt viscosities which preclude high solids loading and many show considerable creep and/or shrinkage after processing. Thermoplastic elastomers typically obtain their thermoplastic properties from segments that form glassy domains which may contribute to physical properties adverse to their use as binders. Cross-linkable thermoplastic elastomers are block copolymers with the property of forming physical cross-links at predetermined temperatures. One thermoplastic elastomer, e.g., Kraton, brand TPE, obtains this property by having the glass transition point of one component block above room temperature. At temperatures below 109° C., the glassy blocks of Kraton form glassy domains and thus physically cross-link the amorphous segments. The strength of these elastomers depends upon the degree of phase separation. Thus, it remains desirable to have controlled, but significant, immiscibility between the two types of blocks, which is a function of their chemical structure and molecular weight. On the other hand, as the blocks become more immiscible, the melt viscosity increases, thus having a deleterious effect on the processability of the material.

Above-mentioned U.S. Pat. No. 4,361,526 proposes a thermoplastic elastomeric binder which is a block copolymer of a diene and styrene, the styrene blocks providing a meltable crystal structure and the diene blocks imparting rubbery or elastomeric properties to the copolymer. The '526 patent states that this polymer is processed with a volatile organic solvent. Solvent processing is undesirable inasmuch as the dissolved composition cannot be cast in a conventional manner, e.g., into a rocket motor casing. Furthermore, solvent-based processing presents problems with respect to removal and recovery of solvent.

The preparation of energetic thermoplastic elastomers prepared from polyoxetane block copolymers has been proposed in U.S. Pat. No. 4,483,978 to Manser and U.S. Pat. No. 4,806,613 to Wardle ("the '613 patent"), the complete disclosures of which are incorporated herein by reference to the extent that these disclosures are compatible with this invention. According to the latter, these materials overcome the disadvantages associated with conventional cross-linked elastomers such as limited pot-life, high end-of-mix viscosity, and scrap disposal problems.

The thermoplastic materials proposed by the '613 patent involve elastomers having both (A) and (B) blocks, each derived from cyclic ethers, such as oxetane and oxetane derivatives and tetrahydrofuran (THF) and tetrahydrofuran derivatives. The monomer or combination of monomers of the (A) blocks are selected for providing a crystalline structure at usual ambient temperatures, such as below about 60° C., whereas the monomer or combination of monomers of the (B) blocks are selected to ensure an amorphous structure at usual ambient temperatures, such as above about −20° C. Typical of these materials is the random block copolymer (poly(3-azidomethyl-3-methyloxetane)-poly(3, 3-bis(azidomethyl)oxetane), also known as poly(AMMO/BAMO). These block copolymers have good energetic and mechanical properties. Additionally, the block copolymers can be processed without solvents to serve as binders in high performance, reduced vulnerability explosive, propellant, and gas generant formulations. Advantageously, the block copolymers exhibit good compatibility with most materials used in such energetic formulations.

However, the block copolymers known in the art suffer from disadvantages that are a consequence of the short linking groups connecting the blocks. More specifically, the short linking groups attribute relatively low softening temperatures to the copolymers. In tactical and other environments in which the binder is exposed to extreme environmental conditions, the binder should be capable of maintaining their structure integrities without creeping or slumping, and be characterized by a reasonable modulus at about 60° C. or above. While the energetic binders disclosed in the '613 patent generally satisfy the processing requirements, they tend to soften unacceptably at elevated temperatures that sometime are encountered in tactical and similar uses.

One proposed solution to addressing this problem and imparting desired high temperature attributes to the energetic binder is to select hard blocks, i.e., A blocks, having melting temperatures well above 60° C. However, the higher softening temperatures of such A blocks deleteriously affects the processability of the binder by requiring higher and sometimes dangerous processing temperatures. Although solvents may be used to improve processability, the introduction of solvents limits the size of the articles that can be made and increases the complexity and costs of the process.

Another desired attribute of energetic binders is that the binders maintain strength, toughness, and strain capability at extremely low temperatures, preferably below about −40° C. The polyethers used as the soft blocks, i.e., B blocks, in energetic thermoplastic elastomer binders tend to possess glass transition temperatures $T_g$ in the range of −15° C. to −30° C. Below these temperatures, the thermoplastic elastomer binders become brittle and lack sufficient toughness and strain capability. While plasticization of the soft B block potentially could be a solution to lowering $T_g$ of the thermoplastic elastomer, all attempts at plasticizing the B block have been found to require unacceptable plasticizer-to-polymer ratios, making the binder unusable at ambient and higher temperatures.

It would, therefore, be a significant advancement in the art to provide energetic thermoplastic elastomer binders that are solid at room temperature and exhibit the excellent mechanical properties and processability of the materials disclosed in the '613 patent, while both possessing sufficiently high elevated temperature modulus and resistance to slump and creep while at the same time having a lower glass transition temperature or ability to be plasticized without adversely affecting high temperature properties.

SUMMARY OF THE INVENTION

The present invention relates to a thermoplastic elastomer that addresses the aforementioned problems associated with the related art and realizes the advancement expressed above.

The present invention includes the provision of an energetic thermoplastic elastomer binder that is in a solid state at room temperature and has A blocks and B blocks connected via linking groups derived from a difunctional urethane oligomer diol. The A blocks are crystalline at temperatures below about 60° C. and may be one or more polyether(s) derived from one or more monomers of oxetane derivatives and/or tetrahydrofuran derivatives. The B blocks are amorphous at temperatures above about −20° C. and may be include one or more polyether(s) derived from one or more monomers of oxetane and its derivatives, tetrahydrofuran and its derivatives, and/or oxirane and its derivatives. To effect linking, the A blocks and B blocks are capped with isocyanate moieties of diisocyanates. The isocyanate moieties of adjacent blocks are linked with an oligomer having two functional moieties that are reactive with an isocyanate moiety of the diisocyanate, hereinafter "a difunctional oligomer." The structure and length of the difunctional oligomer may be varied to tailor the properties of the resulting thermoplastic elastomer.

The present invention also relates to a method for the preparation of the above-described energetic thermoplastic binder of this invention. In accordance with the principles of this invention, hydroxyl-terminated A blocks, which are crystalline at temperatures below about 60° C., and hydroxyl-terminated B blocks, which are amorphous at temperatures above about −20° C., are end-capped with a diisocyanate. The diisocyanate preferably has one isocyanate moiety which is more reactive, preferably at least about five times as reactive, with the terminal hydroxyl group of each of the blocks than the other isocyanate moiety, whereby the more reactive isocyanate moiety tends to react with the terminal-hydroxyl groups of the blocks, leaving the less reactive isocyanate moiety free and unreactive. The end-capped A blocks and the end-capped B blocks are mixed together at approximately the stoichiometric ratios that the blocks are intended to be present in the energetic thermoplastic elastomer. The mixture is reacted with a chain extender, i.e., an oligomeric linking compound having two functional groups which are sufficiently unhindered to react with the free and unreacted isocyanate groups of the end-capped blocks. In this manner, the end-capped blocks are linked, but not cross-linked, to form a thermoplastic polymer.

Propellants, especially rocket propellants and gun propellants, explosives, gas generants, or the like, containing the above-discussed energetic thermoplastic elastomer binder or made by procedures including the above-discussed method are also provided.

BRIEF DESCRIPTION OF THE DRAWINGS

The accompanying drawings are provided to facilitate an understanding of the principles of this invention. In such drawings.

DETAILED DESCRIPTION OF THE INVENTION

Figure 1:
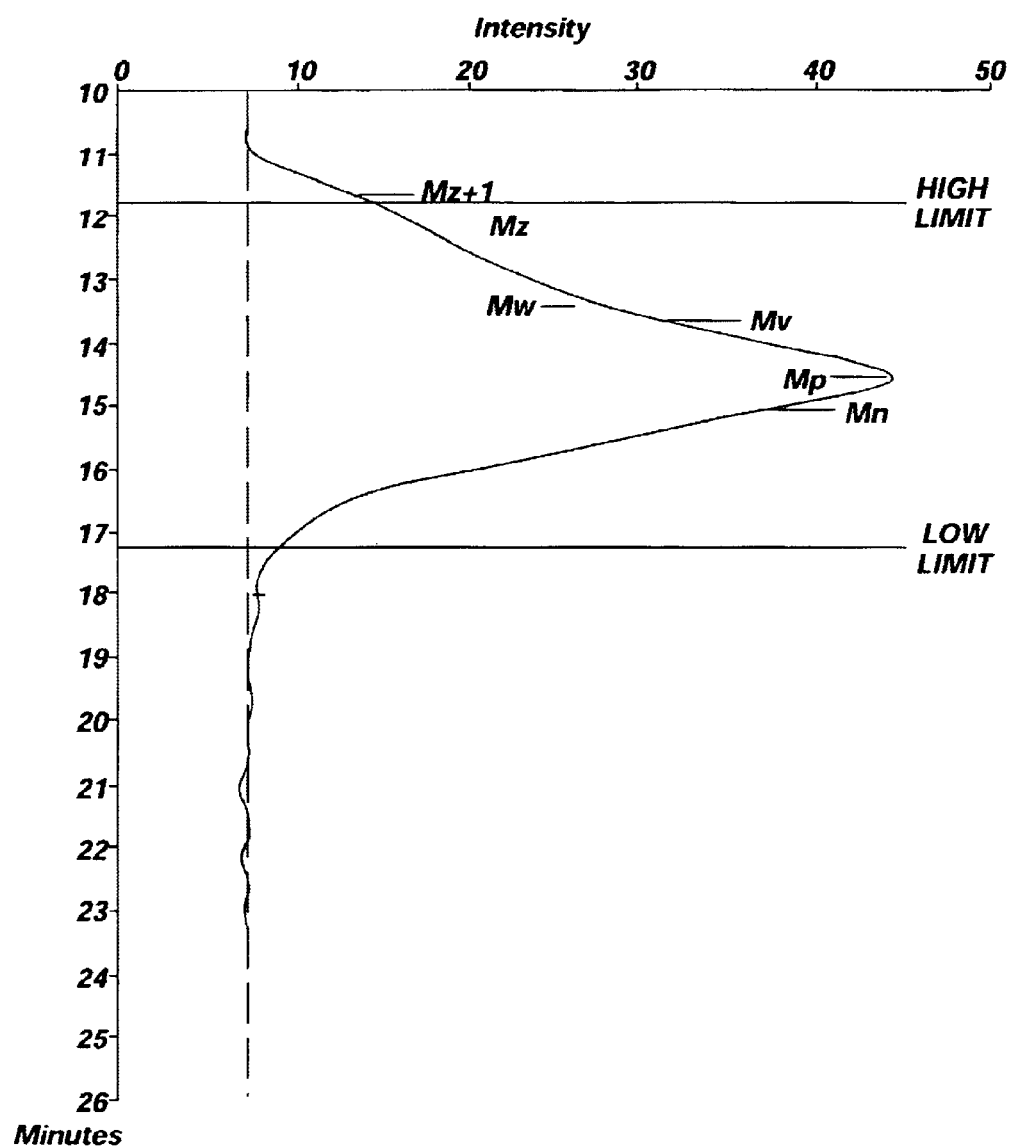
FIGS. 1 and 2 are graphs showing the properties of a thermoplastic elastomer prepared in accordance with an embodiment of this invention.

The thermoplastic elastomer $(AB)_n$ polymers of this invention include A blocks which are crystalline at temperatures below about 60° C., preferably at temperatures below about 75° C., and B blocks which are amorphous at temperatures down to about −20° C. Each of the A and B blocks are polyethers derived from cyclic ethers. More specifically, the A blocks are derived from one or more monomers of oxetane derivatives and/or monomers of one or more THF derivatives. The B blocks are derived from one or more monomers of oxetane and its derivatives, one or more monomers of THF and its derivatives, and/or one or more monomers of oxirane and its derivatives. The polymers melt at temperatures between about 60° C. and about 120° C., and more preferably between about 75° C. and about 100° C. The A and B blocks are mutually miscible in the melt. Consequently, the melt viscosity of the block copolymer decreases rapidly as the temperature is raised above the melting point, whereby high energy formulations may include high solids content, e.g., up to about 95% by weight of solid particulates, and can be easily processed. The invention also includes other thermoplastic elastomer block structures, such as ABA tri-block polymers and $A_nB$ star polymers. Contributing to the miscibility of the A and B blocks is their similar chemical structure.

Oxetane monomer units that may be used in forming the A and B blocks of the present invention have the general formula:

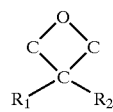

wherein the $R_1$ and $R_2$ groups are the same or different and are selected from moieties having the general formula: —$(CH_2)_nX$, where n is 0–10 and X is selected from the group consisting of —H, —NO$_2$, —CN, —Cl, —F, —O-alkyl, —OH, —I, —ONO$_2$, —N(NO$_2$)-alkyl, —C≡CH, —Br, —CH=CH(H or alkyl), —CO$_2$—(H or alkyl), —N(H or alkyl)$_2$, —O—(CH$_2$)$_{1-5}$—O—(CH$_2$)$_{0-8}$—CH$_3$, and N$_3$.

Examples of oxetane derivatives that may be used in forming the A blocks in accordance with this invention are generally symmetrically-substituted oxetanes including, but are not limited to, the following: BEMO (3,3-(bis(ethoxymethyl)oxetane), BCMO (3,3-bis(chloromethyl)oxetane), BMMO (3,3-bis(methoxymethyl)oxetane), BFMO (3,3-bis(fluoromethyl)oxetane), BAOMO (3,3-bis(acetoxymethyl)oxetane), BHMO (3,3-bis(hydroxymethyl)oxetane), BMEMO (3,3-bis(methoxyethoxymethyl)oxetane), BIMO (3,3-bis(iodomethyl)oxetane), BNMO (3,3-bis(nitratomethyl)oxetane), BMNAMO (3,3-bis(methylnitraminomethyl)oxetane), and BAMO (3,3-bis(azidomethyl)oxetane).

Examples of oxetanes derivatives that may be used in forming the B blocks in accordance with this invention are generally unsymmetrically-substituted oxetanes including, but are not limited to, the following: HMMO (3-hydroxymethyl-3-methyloxetane), OMMO (3-octoxymethyl-3-methyloxetane), CMMO (3-chloromethyl-3-methyloxetane), AMMO (3-azidomethyl-3-methyloxetane), IMMO (3-iodomethyl-3-methyloxetane), PMMO (3-propynomethylmethyloxetane), NMMO (3-nitratomethyl-3-methyloxetane), and MNAMMO (3-methylnitraminomethyl-3-methyloxetane).

Tetrahydrofuran monomer units that may be used in forming the blocks of the present invention have the general formula:

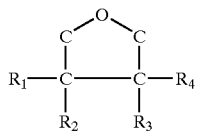

wherein the R$_1$–R$_4$ groups are the same or different and are selected from moieties set forth above in connection with the description of suitable oxetane derivatives.

Oxirane monomer units used in forming the B blocks of the present invention have the general formula:

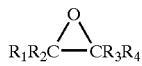

wherein R$_1$ and R$_3$ are independently selected from hydrogen and methyl, and R$_2$ and R$_4$ are independently selected from hydrogen, alkyl containing from 1 to 10 carbon atoms, chloroalkyl and bromoalkyl containing 1 to 2 carbon atoms, and nitratoalkyl, nitratoalkoxyalkyl, nitroalkyl, nitroalkoxyalkyl, azidoalkyl, azidoalkoxyalkyl, fluoronitroalkyl, and fluoronitroalkyoxyalkyl containing 1 to 5 carbon atoms provided that at least one of R$_1$ to R$_4$ is not hydrogen.

Examples of energetic oxiranes that may be used in forming the B blocks in accordance with this invention include, but are not limited to, glycidyl azide polymers (C$_3$H$_5$N$_3$O) (GAP), especially difunctional GAP, and poly(glycidyl nitrate) (C$_3$H$_5$NO$_4$) (PGN). These polymers have a glass transition temperature below about –20° C. and are amorphous at temperatures above –20° C.

Forming thermoplastic elastomers in accordance with the invention involves (1) formation of at least one polyether-derived homopolymer, copolymer, or terpolymer serving as the A blocks and crystalline in nature with a relatively elevated melting point, i.e., between about 60° C. and about 120° C., preferably near 80° C. and (2) formation of at least one polyether-derived homopolymer, copolymer, or terpolymer serving as the B blocks and amorphous in structure with a glass transition temperature (T$_g$) below about –20° C.

The selection of the A block may be made based on the properties desired for the intended application of the thermoplastic elastomer. Examples of preferred crystalline A blocks include blocks possessing high energy density, such as those formed from BAMO and/or BMNAMO monomers. Melting temperature and ether oxygen content are additional factors that may be taken into consideration in selecting the monomers.

The properties of the block polymer depend upon the molecular weights of the individual blocks. Typically the A blocks have number average molecular weights ranging from about 3000 to about 8000, whereas the B blocks have number average molecular weights ranging from about 3000 to about 15,000. The weight ratio of A blocks to B blocks is preferably between about 15:85 to about 40:60. The preferred sizes of the A and B blocks for any particular binder application may be empirically determined.

The thermoplastic elastomers of this invention preferably are in a solid state at room temperature, have a weight average molecular weight of at least 40,000, more preferably at least 60,000, still more preferably at least 80,000, and a number average molecular weight of at least 10,000, more preferably at least 12,000, still more preferably at least 15,000.

Thermoplastic elastomers produced in accordance with the present invention may be admixed with other components of a high energy formulation, such as a propellant formulation. The binder system, in addition to the thermoplastic elastomers, may optionally contain one or more plasticizers for improving the resistance of the thermoplastic elastomer to hardening at low temperatures, which may be included at a plasticizer-to-thermoplastic elastomer weight ratio of up to about 1:1. Suitable high energy plasticizers include glycidyl azide polymer (GAP), nitroglycerine, butanetriol trinitrate (BTTN), alkyl nitratomethyl nitramines, trimethylolethane trinitrate (TMETN), diethylene glycol dinitrate, triethylene glycol dinitrate (TEGDN), bis(dinitropropylacetal/-bis(dinitropropyl)formal (BDNPA/F), and mixtures thereof. Inert plasticizers can also be used. Representative inert plasticizers include, by way of example, dioctyladipate (DOA), isodecylperlargonate (IDP), dioctylphthalate (DOP), dioctylmaleate (DOM), dibutylphthalate (DBP), oleyl nitrile, triacetin, and combinations thereof. The binder system may also contain a minor amount of a wetting agent or lubricant that enables higher solids loading.

The solids content of the high energy composition generally ranges from about 50 wt % to about 95 wt %, higher solids loading generally being preferred so long as such loading is consistent with structural integrity. The solids include fuel material particles and powders (collectively referred to herein as particulates), such as particulate aluminum, and/or oxidizer particulates. Representative fuels include aluminum, magnesium, boron, and beryllium. Representative oxidizers and co-oxidizers include ammonium perchlorate; hydroxylammonium nitrate (HAN); ammonium dinitramide (AND); hydrazinium nitroformate; ammonium nitrate; nitramines such as cyclotetramethylene tetranitramine (HMX) and cyclotrimethylene trinitramine (RDX), 2,4,6,8,10,12-hexanitro-2,4,6,8,10,12-hexaazatetracyclo [5.5.0.0$^{5,9}$.0$^{3,11}$]-dodecane or 2,4,6,8,10,12- hexanitrohexaazaisowurtzitane (CL-20 or HNIW), and/or 4,10-dinitro-2,6,8,12-tetraoxa-4,10-diazatetracyclo [5.5.0.0$^{5,9}$0$^{3,11}$]dodecane (TEX), and any combination thereof. In addition, the high energy composition may include minor amounts of additional components known in the art, such as bonding agents, burn rate modifiers, ballistic modifiers (e.g., lead), etc.

The thermoplastic elastomer may be mixed with the solids and other components of high energy formulation at temperatures above its melting temperature. Blending may be done in conventional mixing apparatus. Because of the low viscosities of the molten polymer, no solvents are required for blending or other processing, such as extrusion.

An important advantage of having a binder which is meltable is that the elastomer from an outdated device containing the binder can be melted down and reused. At the time of such remelting, the binder might be reformulated, e.g., by addition of additional fuel or oxidizer particulates. Accordingly, the thermoplastic elastomer provides for its eventual recycle, as opposed to the burning required for disposal of cross-linked compositions. Because the "pot life" of the thermoplastic propellant exceeds that which would reasonably be required of a propellant or explosive formulation, if any problems develop during casting, the process can be delayed as long as is reasonably necessary, merely by maintaining the formulation in a molten state.

The oxetane homopolymer blocks may be formed according to the cationic polymerization technique taught by Manser in U.S. Pat. No. 4,393,199, the complete disclosure of which is incorporated herein by reference. The oxirane homopolymer blocks may be formed according to the technique taught in U.S. Pat. No. 5,120,827, the complete disclosure of which is incorporated herein by reference. The technique employs an adduct of a substance such as a diol, e.g., 1,4-butane diol (BDO), and a catalyst for cationic polymerization, e.g., BF$_3$-etherate. This adduct forms with the oxetane monomer an initiating species which undergoes chain extension until n moles of monomer have been incorporated in the molecule, n being the ratio of monomers to adduct present. By adjusting the ratio of monomers to adduct present, the average molecular weight of the polymer which forms may be adjusted. If two or more monomers are present, incorporation of the monomers will be generally random but may depend upon the relative reactivities of the monomers in the polymerization reaction.

Another suitable catalyst system includes co-catalytically effective quantities of one or more triethoxonium salts and one or more alcohols, as disclosed in U.S. application Ser. No. 08/233,219, the complete disclosure of which is incorporated herein by reference to the extent that the disclosure is compatible with this invention. Examples of triethoxonium salts include triethoxonium hexafluorophosphate, triethoxonium hexafluoroantimonate, and triethoxonium tetrafluoroborate.

It is understood that although the isocyanate-reactive terminal functional groups of the blocks are referred to herein as being hydroxyl groups, the isocyanate-reactive functional groups may also be amines, amides, and/or carboxyl groups.

The crystalline polyoxetane A blocks and amorphous B blocks, i.e., the respective prepolymers, are each end-capped together or separately with one or more diisocyanates. The end-capped A and B blocks are mixed together and joined by a linking compound which has a pair of isocyanate-reactive functionalities that are sufficiently unhindered to allow them to react with the free isocyanate moieties of the end-capped copolymers and thereby join the blocks together.

Oxetane, THF, and oxirane polymer blocks normally have terminal isocyanate-reactive (e.g., hydroxyl) functions which are end-capped with the diisocyanates in accordance with the invention. Preferably, one of the isocyanate moieties of the end-capping diisocyanate is substantially more reactive with the terminal-hydroxyl moieties of the polymer blocks than the other isocyanate moiety. One of the problems with linking these types of polymer blocks is that substituted oxetane-derived hydroxyl end groups units have neopentyl structures, whereby the terminal primary hydroxyl moieties are substantially hindered and therefore less reactive. The blocks derived from oxirane derivatives are secondary alcohols, making their hydroxyl groups less reactive than the primary hydroxyl groups of the oxetane derived A blocks. The diisocyanate preferably is selected so that one of the isocyanate groups is capable of reacting with a hydroxyl-group of the polymer blocks while the other isocyanate moiety remains free and unreacted. Diisocyanates are preferably used because isocyanates of higher functionality would result in undesirable levels of crosslinking. The different reactivities of the isocyanate moieties is desirable to ensure that substantial chain extension through linking of like blocks does not occur. Thus, for purposes of this invention, one isocyanate moiety of the diisocyanate should preferably be approximately five times more reactive with terminal hydroxyl groups of oxetane and oxirane blocks than the other group. Preferably one isocyanate moiety is at least about ten times more reactive than the other.

One diisocyanate which is especially useful for purposes of the invention is 2,4-toluene diisocyanate (TDI) in which the isocyanate moiety in the 4-position is substantially more reactive with hindered terminal hydroxyl moieties than the isocyanate moiety in the 2-position. Isophorone diisocyanate (IPDI) is suitable for some applications, though less so than TDI. Examples of diisocyanates which have not worked well include diphenylmethylene diisocyanate (MDI) and hexamethylene diisocyanate (HDI).

In the end-capping reaction, the diisocyanate is used at an approximately stoichiometric molar amount relative to terminal hydroxyl groups on the polymer chain. Thus, if the polymer chain has a pair of terminal hydroxyl groups, approximately two molar equivalents, e.g., 1.75–2.2 molar equivalents of diisocyanate are used. In the ideal reaction, all of the more reactive isocyanate moieties would react with terminal hydroxyl groups, leaving all of the less reactive isocyanate moieties free. Practically, not all of the diisocyanate reacts in this manner, and some chain extension does occur. Thus, the end-capping reaction may be maximized for particular polymer chains by some adjustment in the relative molar ratios of polymer block and diisocyanate.

In one variant embodiment, the A blocks and B blocks are reacted separately with the diisocyanate, so that there is no competition of the blocks for diisocyanate molecules and each separate end-capping reaction may be carried to substantial completion. The diisocyanate may react more rapidly with one block than the other, but this difference can be compensated for by a longer reaction time with the slower reacting block. The reactivity of the terminal hydroxyl groups varies according to steric factors and also according to side-chain moieties. Energetic oxetanes, for example, generally have side-chain moieties that are electron-withdrawing, making their terminal hydroxyl groups less reactive. Once end-capped with diisocyanate, the reactivities of the polymers for linking purposes is essentially dependent only upon the reactivity of the free isocyanate, not on the chemical makeup of the polymer chain itself. Thus end-capped (A) blocks are substantially as reactive as end-capped (B) blocks. The end-capping of the oxirane blocks in this manner overcomes the problems associated with linking of oxirane-derived blocks which have secondary hydroxyl groups.

The end-capping reaction and linking reaction are carried out in a suitable solvent, e.g., one which dissolves the polymer and does not react with the free isocyanate moieties. In a preferred embodiment, the solvent is non-halogenated. Although insubstantial amounts of halogenated solvent may be present, the solution is preferably completely free of any halogenated solvent. The non-halogenated solvent should not react in the urethane reaction (i.e., do not interfere with the end-capping catalyst, such as dibutyl tin dilaurate, or the linking catalyst) and forms an azeotrope with water. The solvent or solvents selected preferably are capable of dissolving more than 25% by weight of the blocks (based on total weight of the solvents and blocks) into solution, more preferably at least 35% by weight into solution, and still more preferably 50% by weight into solution. Representative solvents include cyclic ethers such as tetrahydrofuran (THF) and 1,4-dioxane; non-cyclic ethers such as ethylene glycol dimethyl ether; ketones such as methyl ethyl ketone (MEK); and esters such as ethyl acetate. Of these, THF is preferred because of its excellent solubility characteristics.

In a preferred embodiment, the solvent forms an azeotrope with water. In this preferred embodiment, after the blocks are dissolved in excess non-halogenated solvent, the solution may be dried by azeotropic distillation of the solvent, and optionally further concentrated, e.g., via distillation, in the solution to increase the volumetric loading and reaction rate. The blocks then may be end-capped, separately or together, and linked in the same or a different non-halogenated solvent. By distilling off excess solvent to remove water, subsequent reaction with a diisocyanate may proceed without significant interference from competing reactions between the isocyanate moieties and water. Additionally, the solution remains homogeneous and further distillation serves to concentrate the polymer solution, producing higher reaction rates and requiring less reactor capacity. The reaction rates may be improved by conducting the end-capping reaction at elevated temperatures, such as 30° C. to 80° C., more preferably 40° C. to 60° C. The process may be conducted by a batch or continuous method. For example, the prepolymer and catalyst may be continuously fed through a mixer/extruder into which is injected a diisocyanate and a diol at appropriate rates and positions so that urethane linking occurs within the extruder and energetic thermoplastic elastomer is continuously produced for processing.

Suitable catalysts for promoting the end-capping reaction include, as a preferred class, organic tin compounds with at least one and preferably two labile groups, such as chloride or acetate, bound directly to the tin. Suitable tin catalysts include diphenyl tin dichloride, dibutyl tin dichloride, dibutyl tin dilaurate, dibutyl tin diacetate. Tertiary amine catalysts may also be used.

The oligomeric linking compound is one which has two functional groups which are sufficiently unhindered to react with the free isocyanate moieties on the end-capped blocks so as to link A blocks to B blocks, A blocks to A blocks, and B blocks to B blocks via a urethane reaction. Preferred functional groups are hydroxyl groups, although amine, amide, and carboxyl groups and mixtures thereof also react in a urethane reaction. Primary functional groups are preferred.

An oligomeric glycol containing urethane moieties is preferably used to react the free isocyanate moieties on the end-capped blocks. The oligomeric glycol may be prepared from a mixture of one or more diisocyanates and an excess amount of one or more diols. The diisocyanate(s) and diol(s) selected and the ratio of these reagents may be varied to tailor the properties of the thermoplastic elastomer. The diol to diisocyanate molar ratio is preferably selected to be between 5:1 to 5:4, more preferably about 2:1, to maintain acceptable processing temperatures, obtain adequate linking of the isocyanate-capped prepolymers, and improve the thermomechanical properties of the final thermoplastic elastomer. A suitable urethane reaction catalyst promotes the reaction between the diisocyanate(s) and diol(s) to form oligomers. The catalysts discussed above in connection with the linking of the A and B blocks are suitable for this purpose. Representative diols that may be selected for preparing the difunctional oligomer include, by way of example, unbranched aliphatic diols having 2 to 7 carbon atoms, such as ethylene glycol, propylene glycol, butylene glycol; and cycloaliphatic diols such as 1,4-cyclohexanedimethanol, and any combination thereof. Representative diisocyanates for preparing the difunctional oligomer include, by way of example, aliphatic diisocyanates such as hexane diisocyanate, and aryl diisocyanates such as methylene-bis(4-phenyl isocyanate), phenylene diisocyanate, toluene diisocyanate, and xylylene diisocyanate, and any combination thereof. Preferably, the difunctional oligomer has a number average molecular weight $M_n$ of from 350 to 900.

As in the end-capping reaction, some solvent is preferably used, as is a catalyst, such as described above. Conveniently, the reaction mixtures of the A blocks and B blocks may be mixed together without prior separation of the blocks from their respective end-capping reaction mixtures. The linking compound can be added directly to this mixture of A and B blocks. The catalyst is thereby already present when the linking compound is added.

The linking compound is added in an amount such that the total number of linking-compound functional groups approximately equals the total number of free isocyanate groups of the end-capped polymer blocks. Thus, to provide an $(AB)_n$ polymer with multiple blocks in each chain, the linking compound to polymer block molar ratio is in the range of 0.9–1.1, e.g., 1.0. Accordingly, optimal molar ratios of blocks and linking chemicals may have to be empirically determined.

In the end-capping and block linking steps, the reaction can be followed with NMR and IR. With NMR, the urethane-forming reaction can be followed through the methylene groups on the polymer adjacent to the terminal hydroxyl groups. With IR, the change from isocyanate to urethane can be directly followed.

Synthesis of polyoxetanes is described in U.S. Pat. Nos. 4,483,978 and 4,806,613, the complete disclosures of which are incorporated herein by reference to the extent such disclosures are compatible with this invention.

The invention will now be described in greater detail by way of the following examples, which are not to be construed as being exhaustive as to the scope of this invention.

As referred to herein, "dry" means that less than 1 wt % water was present.

For the following experiments, poly(azidomethyloxirane) was supplied by 3M Speciality Chemicals of St. Paul, Minn. (Lot L-12564). Unless otherwise specified, all other materials were obtained from Aldrich of Milwaukee, Wis.

EXAMPLE 1 poly(3,3-bis(azidomethyl)oxetane)

A 5 liter jacketed flask equipped with a mechanical stirrer was charged with 600 grams of tribromoneopentylalcohol (AmeriBrom, Inc. of New York), 1200 ml of toluene, and 6 grams of tetrabutylammonium bromide. The mixture was cooled to 12° C. and 193 grams of sodium hydroxide was added dropwise as a 40 wt % solution keeping the temperature at 12° C. After 36 hours, the reaction mixture was washed with water until the pH was less than 9 to obtain the crude product which was distilled to obtain 3,3-bis(bromomethyl)oxetane at 65% yield.

A 5 liter jacketed flask equipped with a mechanical stirrer was charged with 1450 grams of the 3,3-bis(bromomethyl)oxetane and 1720 ml of toluene. The mixture was stirred and heated to 60° C. before 1600 ml of water, 14.7 grams of tetrabutylammonium bromide, and 862 grams of sodium azide were added. After 24 hours, the reaction mixture was cooled to room temperature and washed three times with 2000 ml of water. The toluene and water were removed from the organic layer by distillation to give pure 3,3-bis(azidomethyl)oxetane at 85% yield.

Under an argon atmosphere, 14.94 grams of butane diol was added to a flame dried 5 liter round-bottomed flask charged with 1340 ml of dry methylene chloride. To this mixture, 11.77 grams of borontrifluoride-etherate was added and the reaction was allowed to proceed for one hour at room temperature. The reactor was then cooled to −10° C. and 937.78 grams of the 3,3-bis(azidomethyl)oxetane was added. The solution was allowed to come to room temperature and left to react for three days. The reaction was then quenched by the addition of 50 ml of saturated brine solution. The organic phase was separated off and washed with 100 ml of 10 wt % sodium bicarbonate solution before the solvent was removed on a rotovapor. The resulting liquid was then poured into 5 liters of methanol to precipitate the polymer, which was filtered from the solution and dried under vacuum at 30° C.

EXAMPLE 2 poly(3-azidomethyl-3-methyloxetane)

A 5 liter jacketed flask equipped with a mechanical stirrer was charged with 1062 grams of sodium azide, 1972 ml of water, and 2450 grams of 3-bromomethyl-3-methyloxetane (supplied by AmeriBrom, Inc. of New York). This mixture was brought to reflux with vigorous mixing. After 48 hours, the mixture was cooled to room temperature. The organic layer was separated off and washed three times with 1000 ml of water before being dried over molecular sieves to yield pure 3-azidomethyl-3-methyloxetane at 85% yield.

Under an argon atmosphere, 14.94 grams of butane diol was added to a flame dried 5 liter round-bottomed flask charged with 1.340 ml of dry methylene chloride. To this mixture, 11.77 grams of borontrifluoride-etherate was added and the reaction was allowed to proceed for one hour at room temperature. The reactor was then cooled to −10° C. and 937.78 grams of the 3-azidomethyl-3-methyloxetane was added. The solution was allowed to come to room temperature and left to react for three days. The reaction was then quenched by the addition of 50 ml of saturated brine solution. The organic phase was separated off and washed with 100 ml of 10 wt % sodium bicarbonate solution before the solvent was removed on a rotovapor. The resulting liquid was then poured into 5 liters of methanol to precipitate the polymer, which was filtered from the solution and dried under vacuum at 30° C.

EXAMPLE 3

Random Block Copolymer of poly(3-azidomethyl-3-methyloxetane) and poly(3,3-bis(azidomethyl)oxetane) Linked with a Urethane Oligomer In a 25 ml round bottom flask, a urethane oligomer was prepared by dissolving 2.70 grams of toluene-2,4-diisocyanate in 5 ml tetrahydrofuran and adding to the solution 0.2 grams of dibutyltin dilaurate followed by 2.80 grams of butane-1,4-diol. This reaction mixture was stirred for 1 hour at room temperature.

In a separate 500 ml round bottom flask, 68.34 grams of dry dihydroxyl poly(3-azidomethyl-3-methyloxetane) with a hydroxyl equivalent weight of 3356 and 34.54 grams of dry poly(3,3-bis(azidomethyl)oxetane) with a hydroxyl equivalent weight of 3235 were dissolved in 400 ml of dry methylene chloride. The solution was concentrated and dried by evaporation of the tetrahydrofuran under reduced pressure via a rotovapor until 100 grams of the solvent remained. To this solution, 2.5 grams of dibutyltin dilaurate and 5.61 grams of toluene-2,4-diisocyanate were added while stirring with a magnetic stirrer at ambient temperature and pressure. After one hour, the urethane oligomer was added to this solution, causing the solution to become steadily more viscous. After an additional four hours, the solution was diluted with methanol in a volume ratio of 1:5. The methanol was decanted off, and the precipitated polymer was washed three times with fresh methanol (1:5 volume ratio) to give a rubbery granular product with the following properties:

$E^{1.0}(\text{psi})=1122$ $\epsilon_m(\%)=303$ $\epsilon_f(\text{failure})(\%)=327$ $\sigma_m(\text{psi})=362$ $\sigma_m(\text{corrected})(\text{psi})=1504$ Shore$A=63$ ($E^{1.0}$ represents Young's Modulus. $\epsilon_m$ and $\epsilon_f$, respectively representing maximum measured strain and calculated failure strain, and $\sigma_m$ and $\sigma_m$ (corrected), respectively representing measured maximum stress and calculated corrected maximum stress, were measured using an INSTRON model 1225. The cross-head speed was 0.6 inches per minute. Measurements were made at room temperature using 20 mm×4 mm dumbbell samples. Shore A, representing hardness, was measured on a Shore Conveloader at room temperature.)

EXAMPLE 4

Random Block Copolymer of poly(azidomethyloxirane) and poly(3,3-bis(azidomethyl)oxetane)

In a 25 ml round bottom flask, a urethane oligomer was prepared by dissolving 1.55 grams of toluene-2,4-diisocyanate in 4 ml tetrahydrofuran and adding to the solution 0.1 ml of dibutyltin dilaurate followed by 1.60 grams of butane-1,4-diol. This reaction mixture was stirred for 1 hour at room temperature.

In a separate 250 ml round bottom flask, 17.94 grams of dry difunctional poly(azidomethyloxirane) with a hydroxyl equivalent weight of 1174 and 6.63 grams of dry poly(3,3-bis(azidomethyl)oxetane) with a hydroxyl equivalent weight of 2390 were dissolved in 100 ml of dry tetrahydrofuran. The solution was concentrated and dried by evaporation of the tetrahydrofuran under reduced pressure via a rotovapor until 20 grams of the solvent remained. To this solution, 75 ml of dibutyltin dilaurate and 3.097 grams of toluene-2,4-diisocyanate were added while stirring with a magnetic stirrer at ambient temperature and pressure. After one hour, the urethane oligomer was added to this solution, causing the solution to become steadily more viscous. After 20 minutes, the solution was too viscous to stir and was diluted with 20 ml of dry tetrahydrofuran and allowed to react for a further 20 minutes before being poured into methanol in a volume ratio of 1:5. The methanol was decanted off, and the precipitated polymer was washed three times with fresh methanol (1:5 volume ratio) to give a rubbery granular product with the properties shown in FIGS. 1 and 2 and set forth below:

Mn=26240

Mw=175500

Mw/Mn=6.69

Figure 2:
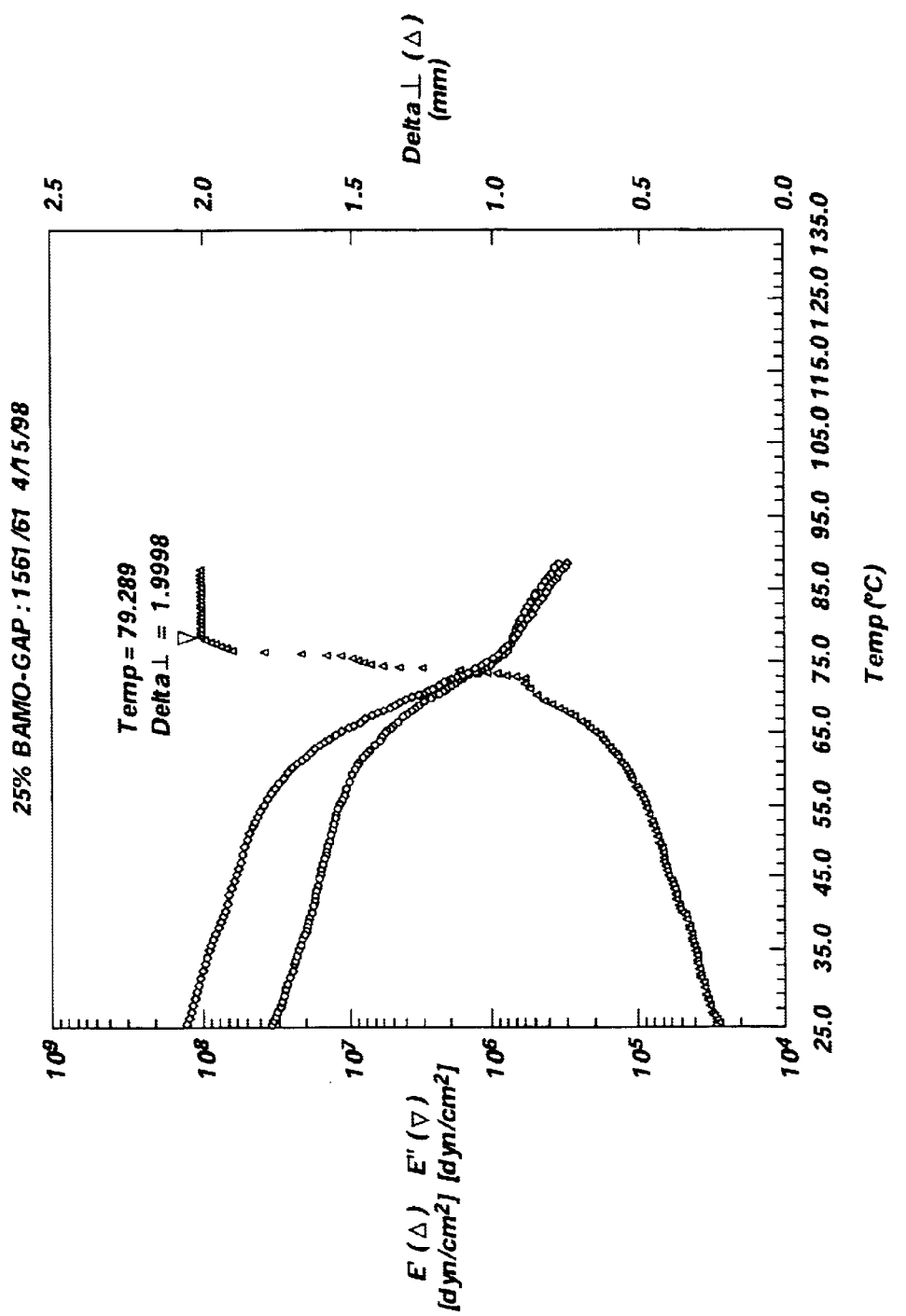

Molecular weight distribution was determined by gel permeation chromotography using polystyrene standards, with the results shown in FIG. 1. The GPC trace in FIG. 1 demonstrates that the prepolymers were linked to produce a copolymer having a higher molecular weight and dispersivity than the homopolymer blocks. The DMA trace in FIG. 2 shows the melt transition of random block (BAMO-GAP)$_n$ at 75–80° C. with a material modulus reducing only slowly before this point.

EXAMPLES 5–7

Random Block Copolymer of poly(3-azidomethyl-3-methyloxetane) and poly(3,3-bis(azidomethyl)oxetane) Linked with a Urethane Oligomer In a 500 ml round bottom flask, 45 grams of difunctional poly(3-azidomethyl-3-methyloxetane) with a hydroxyl equivalent weight of 3125 and 15 grams of poly(3,3-bis(azidomethyl)oxetane) with a hydroxyl equivalent weight of 3152 were dissolved in 300 ml of tetrahydrofuran. The solution was concentrated and dried by evaporation of the tetrahydrofuran or a rotovapor until a solution with 90 grams of solvent remained. To this solution, 0.6 grams of dibutyltin dichlonide and 3.34 grams of toluene-2,4-diisocyanate was added and the mixture allowed to react for 3 hours to end-cap the prepolymer.

For Example 5, 0.22 grams of butanediol was added to one quarter of the isocyanate end-capped prepolymer mixture. The reaction was allowed to continue for 14 hours before it was precipitated with methanol in a volume ratio of 1:5. The methanol was decanted off, and the precipitated polymer was washed three times with fresh methanol (1:5 volume ratio) to give a rubbery granular product.

For Example 6, a urethane oligomer was derived from a mixture of 2 ml of tetrahydrofuran, 0.42 grams of toluene-2,4-diisocyanate, 0.43 grams of butane-1,4-diol, and 0.1 grams of dibutyltin dichloride, which were allowed to react for one hour. The urethane oligomer was then added to one quarter of the isocyanate end-capped prepolymer mixture and allowed to react for 14 hours before it was precipitated with methanol in a volume ratio of 1:5. The methanol was decanted off, and the precipitated polymer was washed three times with fresh methanol (1:5 volume ratio) to give a rubbery granular product.

For Example 7, a urethane oligomer was derived from a mixture of 2 ml of tetrahydrofuran, 0.83 grams of toluene-2,4-diisocyanate, 0.65 grams of butane-1,4-diol, and 0.1 grams of dibutyltin dichloride, which were allowed to react for one hour. The urethane oligomer was then added to one quarter of the isocyanate end-capped prepolymer mixture and allowed to react for 14 hours before it was precipitated with methanol in a volume ratio of 1:5. The methanol was decanted off, and the precipitated polymer was washed three times with fresh methanol (1:5 volume ratio) to give a rubbery granular product.

TABLE 1

|  | Example 5 | Example 6 | Example 7 |
|---|---|---|---|
| diol:diisocyanate molar ratio | 1:0 | 2:1 | 3:2 |
| Mn | 11440 | 12340 | 13240 |
| Mw | 134800 | 142000 | 122600 |
| Mw/Mn | 11.78 | 11.51 | 9.26 |
| $E^{1.0}$ | 520 | 669 | 823 |
| $\epsilon_m$ (%) | 311 | 897 | 536 |
| $\epsilon_f$ (failure) (%) | 372 | 1082 | 562 |
| $\sigma_m$ (psi) | 153 | 345 | 300 |
| $\sigma_m$ (corrected) (psi) | 678 | 3575 | 2381 |
| ShoreA | 49 | 60 | 65 |

EXAMPLE 8 AND COMPARATIVE EXAMPLE A

In a 50 ml beaker, 10 grams of random block poly(3-azidomethyl-3-methyloxetane)polymer(3,3-bis(azidomethyl)oxetane)) prepared with either an oligomeric linkage derived from butane-1,4-diol and toluene-2,4-diisocyanate (Example 8) or butane-1,4,-diol (Comparative Example A) were dissolved in 10 ml of tetrahydrofuran. To this solution, 1.25 grams of triethyleneglycol dinitrate and 1.25 grams of butyl nitratoethylnitramine were added. The solvent was removed by evaporation in a vacuum over at 60° C. The plasticized polymer was then melted at 90° C., poured onto a flat TEFLON® plate and allowed to solidify at room temperature for 48 hours before being cut into 20 mm×4 mm dumbbell samples and subjected to testing:

TABLE 2

|  | Example 8 | Comparative Example_A |
|---|---|---|
| diol:diisocyanate molar ratio | 2:1 | 1:0 |
| wt % energetic plasticizer | 20 | 20 |
| $E^{1.0}$ (psi) | 174 | Plasticized polymer too soft to make samples |
| $\epsilon_m$ (%) | 126 |  |
| $\epsilon_f$ (corrected) (%) | 139 |  |
| $\sigma_m$ (psi) | 62 |  |
| $\sigma_m$ (corrected) (psi) | 141 |  |
| ShoreA | 28 |  |

The foregoing detailed description of the preferred embodiments of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A thermoplastic elastomer having A blocks and B blocks and being present in a solid state suitable for use as a binder for at least one of a propellant, explosive, and gasifier, the thermoplastic elastomer being formulated from a composition comprising, as constituents:

A blocks terminated with isocyanate-reactive groups derived from monomers comprising at least one member selected from the group consisting of oxetane derivatives and tetrahydrofuran derivatives, the A blocks being crystalline below about 75° C.;

B blocks terminated with isocyanate-reactive groups derived from monomers comprising at least one member selected from the group consisting of oxetane and derivatives thereof, tetrahydrofuran and derivatives thereof, and oxirane and derivatives thereof, the B blocks being amorphous above about −20° C.; and linking groups derived from at least one diisocyanate for end-capping the A blocks and the B blocks and at least one difunctional oligomer comprising two functional groups which are reactive with isocyanate moieties of the at least one diisocyanate.

2. The thermoplastic elastomer as defined in claim 1, wherein:

the at least one diisocyanate contains a first isocyanate moiety which is at least five times more reactive with terminal groups of the blocks than a second isocyanate moiety thereof, wherein the more reactive first isocyanate moiety is capable of reacting with and end-capping the terminal groups of the blocks, leaving the less reactive second isocyanate moiety free and unreacted; and the at least one difunctional oligomer has two isocyanate-reactive hydroxyl groups which are sufficiently sterically unhindered to be reactive with the free and unreacted second isocyanate moieties of the end-capped blocks.

3. The thermoplastic elastomer as defined in claim 2, wherein the at least one diisocyanate comprises 2,4-toluene diisocyanate.

4. The thermoplastic elastomer as defined in claim 1, wherein the A blocks are crystalline below about 60° C.

5. The thermoplastic elastomer as defined in claim 1, wherein the at least one difunctional oligomer comprises a reaction product of at least one diol and at least one diisocyanate, the at least one diol being selected from the group consisting of ethylene glycol, propylene glycol, butylene glycol, and 1,4-cyclohexanedimethanol, and any combination thereof.

6. The thermoplastic elastomer as defined in claim 1, wherein the at least one difunctional oligomer comprises a reaction product of at least one diol and at least one diisocyanate, the at least one diisocyanate being selected from the group consisting of hexane diisocyanate, methylene-bis(4-phenyl isocyanate), phenylene diisocyanate, toluene diisocyanate, and xylylene diisocyanate, and any combination thereof.

7. The thermoplastic elastomer as defined in claim 1, wherein the thermoplastic elastomer has a weight average molecular weight of at least 40,000 and a number average molecular weight of at least 10,000.

8. The thermoplastic elastomer as defined in claim 1, wherein the thermoplastic elastomer has a weight average molecular weight of at least 60,000 and a number average molecular weight of at least 12,000.

9. The thermoplastic elastomer as defined in claim 1, wherein the thermoplastic elastomer has a weight average molecular weight of at least 80,000 and a number average molecular weight of at least 15,000.

10. The thermoplastic elastomer as defined in claim 1, wherein a weight ratio of A to B blocks is between about 15:85 to about 40:60.

11. The thermoplastic elastomer as defined in claim 1, wherein the isocyanate-reactive terminal groups of the A and B blocks are hydroxyl groups.

12. The thermoplastic elastomer as defined in claim 1, wherein the at least one difunctional oligomer comprises a urethane glycol.

13. A thermoplastic elastomer having A blocks and B blocks and being present in a solid state suitable for use as a binder for at least one of a propellant, explosive, and gasifier, the thermoplastic elastomer being formulated from a composition comprising, as constituents:

A blocks terminated with isocyanate-reactive groups derived from monomers comprising at least one member selected from the group consisting of 3,3-(bis (ethoxymethyl)oxetane, 3,3-bis(chloromethyl)oxetane, 3,3-bis(methoxymethyl)oxetane, 3,3-bis(fluoromethyl) oxetane), 3,3-bis(acetoxymethyl)oxetane, 3,3-bis (hydroxymethyl)oxetane, 3,3-bis (methoxyethoxymethyl)oxetane, 3,3-bis(iodomethyl) oxetane, 3,3-bis(nitratomethyl)oxetane, 3,3-bis (methylnitraminomethyl)oxetane, and 3,3-bis (azidomethyl)oxetane), the A blocks being crystalline below about 60° C.;

B blocks terminated with isocyanate-reactive groups derived from monomers comprising at least one member selected from the group consisting of 3-hydroxymethyl-3-methyloxetane, 3-octoxymethyl-3-methyloxetane, 3-chloromethyl-3-methyloxetane, 3-azidomethyl-3-methyloxetane, 3-iodomethyl-3-methyloxetane, 3-propynomethylmethyloxetane, 3-nitratomethyl-3-methyloxetane, 3-methylnitraminomethyl-3-methyloxetane, tetrahydrofuran, glycidyl azide, and glycidyl nitrate, the B blocks being amorphous above about −20° C.; and linking groups derived from at least one diisocyanate for end-capping the A blocks and the B blocks and at least one difunctional oligomer comprising two functional groups which are reactive with isocyanate moieties of the at least one diisocyanate.

14. The thermoplastic elastomer as defined in claim 13, wherein:

the at least one diisocyanate contains a first isocyanate moiety which is at least five times more reactive with the terminal groups of the blocks than a second isocyanate moiety thereof, wherein the more reactive first isocyanate moiety is capable of reacting with and end-capping the terminal groups of the blocks, leaving the less reactive second isocyanate moiety free and unreacted; and the at least one difunctional oligomer has two isocyanate-reactive hydroxyl groups which are sufficiently sterically unhindered to be reactive with the free and unreacted second isocyanate moieties of the end-capped blocks.

15. The thermoplastic elastomer as defined in claim 13, wherein the at least one diisocyanate comprises 2,4-toluene diisocyanate.

16. The thermoplastic elastomer as defined in claim 13, wherein the at least one difunctional oligomer comprises a reaction product of at least one diol and at least one diisocyanate, the at least one diol being selected from the group consisting of ethylene glycol, propylene glycol, butylene glycol, 1,4-cyclohexanedimethanol, and any combination thereof.

17. The thermoplastic elastomer as defined in claim 13, wherein the at least one difunctional oligomer comprises a reaction product of at least one diol and at least one diisocyanate, the at least one diisocyanate being selected from the group consisting of hexane diisocyanate, methylene-bis(4-phenyl isocyanate), phenylene diisocyanate, toluene diisocyanate, xylylene diisocyanate, and any combination thereof.

18. The thermoplastic elastomer as defined in claim 13, wherein a weight ratio of A to B blocks is between about 15:85 to about 40:60.

19. The thermoplastic elastomer as defined in claim 13, wherein the isocyanate-reactive terminal groups of the A and B blocks are hydroxyl groups.

20. The thermoplastic elastomer as defined in claim 13, wherein the at least one difunctional oligomer comprises a urethane glycol.

* * * * *